Nov. 25, 1924.

A. O. AUSTIN 1,516,585

INSULATOR

Filed Dec. 6, 1920  9 Sheets-Sheet 1

Witness:
R. L. Orrington

Inventor,
Arthur O Austin
By Nissen & Gerard
Attys

Nov. 25, 1924.                            1,516,585
A. O. AUSTIN
INSULATOR
Filed Dec. 6, 1920        9 Sheets-Sheet 2

Nov. 25, 1924.  1,516,585

A. O. AUSTIN

INSULATOR

Filed Dec. 6, 1920    9 Sheets-Sheet 4

Nov. 25, 1924.

A. O. AUSTIN

INSULATOR

Filed Dec. 6 1920

A. O. AUSTIN 1,516,585

INSULATOR

Filed Dec. 6, 1920  9 Sheets-Sheet 7

Nov. 25, 1924.

A. O. AUSTIN

INSULATOR

Filed Dec. 6, 1920

Patented Nov. 25, 1924.

1,516,585

UNITED STATES PATENT OFFICE.

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY.

INSULATOR.

Application filed December 6, 1920. Serial No. 428,437.

*To all whom it may concern:*

Be it known that I, ARTHUR O. AUSTIN, a citizen of the United States, residing at Barberton, in the county of Summit and State of Ohio, have invented certain new and useful Improvements in Insulators, of which the following is a specification.

This invention relates to electrical insulators, and especially to insulators for high potentials, and has for its object the provision of insulators which shall be of improved construction and operation.

The invention is exemplified in the combination and arrangement of parts shown in the accompanying drawings and described in the following specification, and it is more particularly pointed out in the appended claims.

In high tension insulators where two conductors of different potentials are separated from one another by an insulating member, it is well known that an electro-static field is present in which the lines of force extend through the insulator and the surrounding medium from one of the conductors to the other. These lines of force are most closely concentrated at the portions of the insulated conductors which are nearest to one another. The lines of force also tend to emanate from any restricted projections or points formed upon the conductors so that such points are surrounded by a concentrated field.

When insulators or dielectrics are worked at high pressures or potentials there is a tendency to produce a concentration of electro-static flux. This concentration of electro-static flux may set up a stress of such magnitude that it will damage the dielectric. This stress may be set up around a conductor imbedded in a solid dielectric or around a conducting surface which operates in a medium, such as air, oil, wax, or other medium. When the conducting surface operates in air, corona or brush discharge may occur at a fairly low voltage, particularly where the conductor has a sharp edge or point. If corona or brush discharge occurs at normal frequency, say 60 cycles, and an electrical stress at high frequency is impressed on the electrode, the current will be increased in the streamer or brush dischage. Since the resistance of the streamer drops off very rapidly with an increase in the current, it is seen that where the frequency is high the current may be very materially increased. This increase in current lowers the resistance in the streamer permitting the streamer to flow out further from the electrode. This increase in distance increases the capacitance of the streamer and permits more current to flow. The increased current in turn still further lowers the resistance in the streamer so that it extends still further. Where a persistent wave at high frequency is applied, such as in wireless work, a comparatively small voltage will cause the streamer to build out several feet once it is started. This streamer may arc to ground or absorb considerable energy or damage any insulator which may be near the surface which discharges.

In wireless work where a high frequency generator is used, or the equivalent, the point of brush discharge from a conducting surface limits the voltage which may be used. If this discharging surface is covered by a dielectric having greater strength than the air, it may be possible to operate at a higher voltage or stress as a streamer which will grow to serious proportions is prevented. It will be seen that where this is the condition and a strong dielectric is used to cover the surface which has greatest tendency to discharge, a higher operating voltage may be used.

Figures 1, 2, 3:
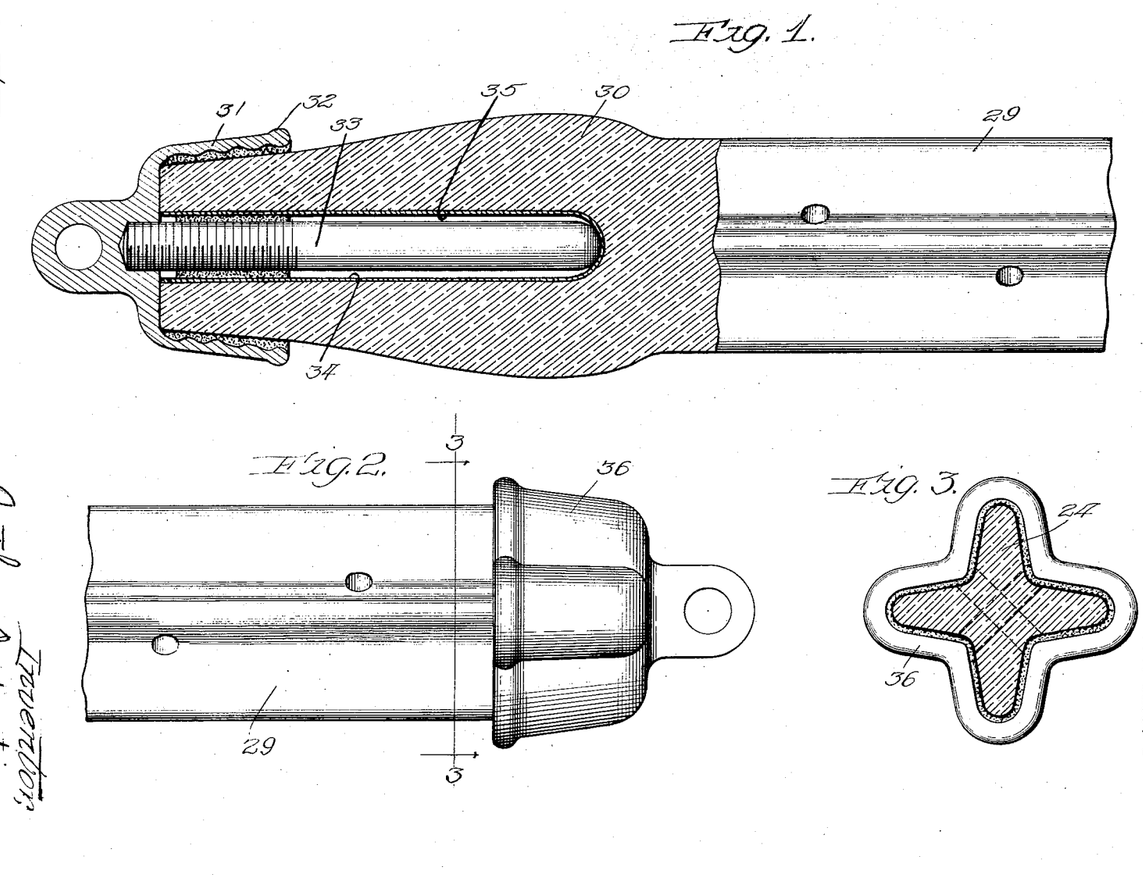
Fig. 1 is an elevation of one end of an insulator partly in section showing one form of the invention.
Fig. 2 is a view of the opposite end of the insulator from that shown in Fig. 1.
Fig. 3 is a section on line 3—3 of Fig. 2.

In Fig. 1 an insulator is shown which is of a special structural cross-sectional shape, as indicated in Fig. 3, to provide greater resistance to bending moments. It will be understood, however, that the invention is not confined to any special cross-sectional shape. The end of the insulator which is to be connected with the charged body is provided with a somewhat enlarged portion 30 which tapers toward the end and is fitted with a cap 31 secured in place by cement 32 in the usual manner. An internal conductor 33 is enclosed in an opening 34 in the end of the insulator, the opening being plated with conducting material, as shown at 35. The conductor or pin 33 may be secured to the interior of the opening 34 by cement or otherwise to form a supplemental interior connection between the cap and the insulator. The end of the pin 33 constitutes a radiating point for the electro-static flux and is surrounded by the dielectric material of the insulator 29 so that danger of electrical discharge along the lines of force emanating from the pin are avoided. The coating 35 should extend over the rounded surface at the inner end of the opening where it forms electrical contact with the end of the pin 33. The coating may also extend to the end of the insulator so that it forms contact with the end of the cap 31. In some cases either the pin or the coating may be used alone. It will be seen that since the screening member comprising the pin 33 and coating 35 extends into the field of force beyond the mechanical supporting member the screening member will divert the flux from the medium surrounding the exposed surface of the mechanical support 31 and cause the flux to emanate through the dielectric material adjacent the screen, thus overcoming the tendency to discharge where the static field is concentrated.

The opposite end of the insulator may be provided with a simple attachment cap 36, as illustrated in the drawings, or it may be provided with an internal flux member like that shown at 33.

Figure 4:
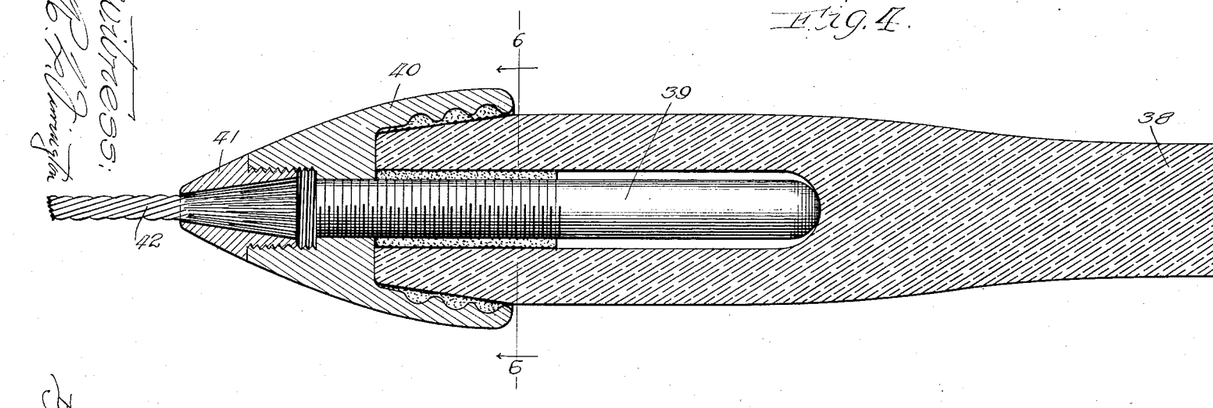
Figs. 4 and 5 constitute a longitudinal sectional view of a different form of the invention.
Figure 5:
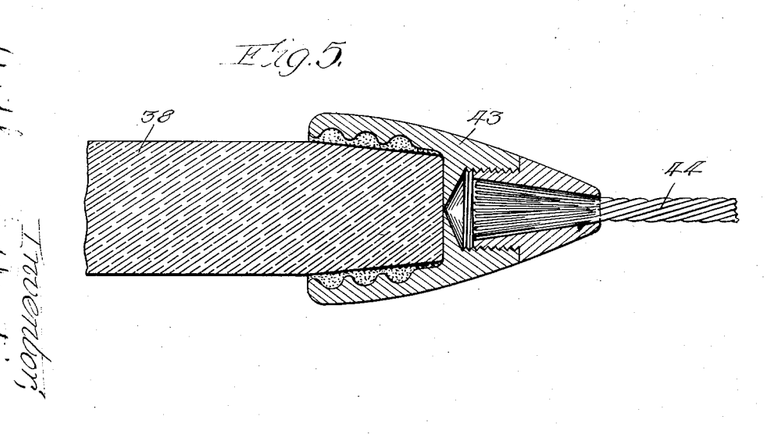
Figure 6:
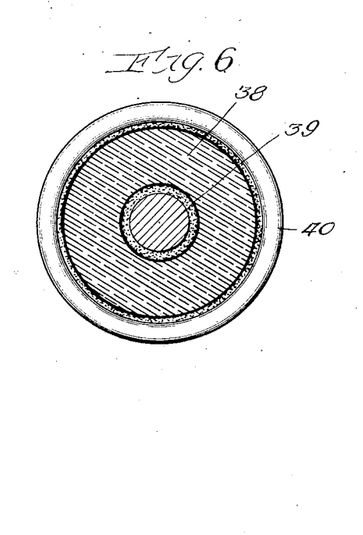
Fig. 6 is a transverse section on line 6—6 of Fig. 5.

In the form shown in Figs. 4, 5 and 6, the insulator 38 is provided with an internal flux member 39 secured to an end cap 40, the end cap 40 being tapered and attached to a plug 41 threaded into the end of the cap and provided with a cable 42 by which the insulator is supported. This form of insulator is especially suitable for use in submarine work where the insulator must be drawn through the water and is liable to become entangled with various obstructions beneath the surface.

The opposite end of the insulator may be a duplicate of the end described, or it may be provided with a simple end cap 43 attached to a cable 44 and the internal flux member omitted.

Figure 7:
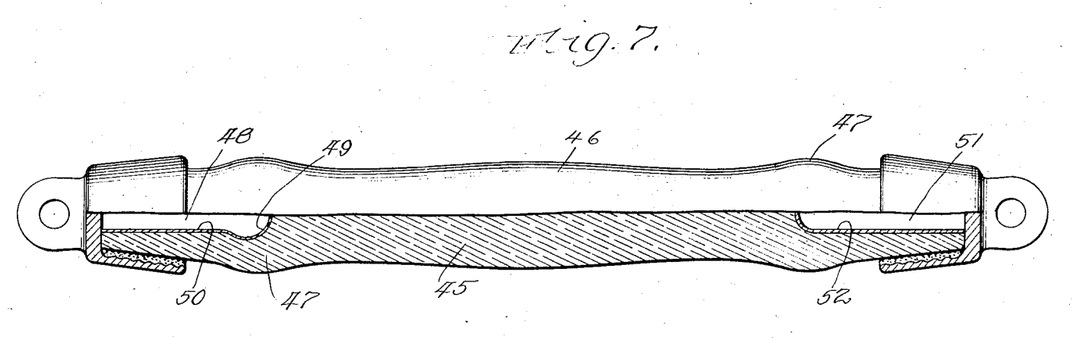
Figs. 7, 8, 9, 10, 11, 12, 13, 14 and 15 are all sectional views of various forms of insulators illustrating different embodiments of the invention.

In the form of the invention shown in Fig. 7 the body member 45 of the insulator is provided with a central bulged or swelled portion 46 to impart mechanical reliability to the insulator. The insulator is also bulged at 47 adjacent each end to provide increased dielectric strength at the points where the electro-static flux emanates. The end of the insulator shown at the left of the figure is provided with an inwardly extending opening 48 which is enlarged at the inner end, as shown at 49. The interior of the opening 48 is entirely coated with a conducting film 50 which provides an insulated flux distributing member within the material of the insulator. The enlarged portion 49 tends to decrease the flux density at the end of the flux member comprising the coating 50. The enlarged or thickened portion 47 of the dielectric member is positioned adjacent the end of the opening 48 in order to provide additional dielectric strength at this point. The opposite end of the insulator is provided with an opening 51 similar to the opening 48, with the exception that the end is merely rounded and not enlarged. A metallic coating 52 for the interior of the opening 51 is provided. In some cases it may be easier to form an opening like that shown at 51 than an opening having an enlarged end as shown at 49.

Figure 8:
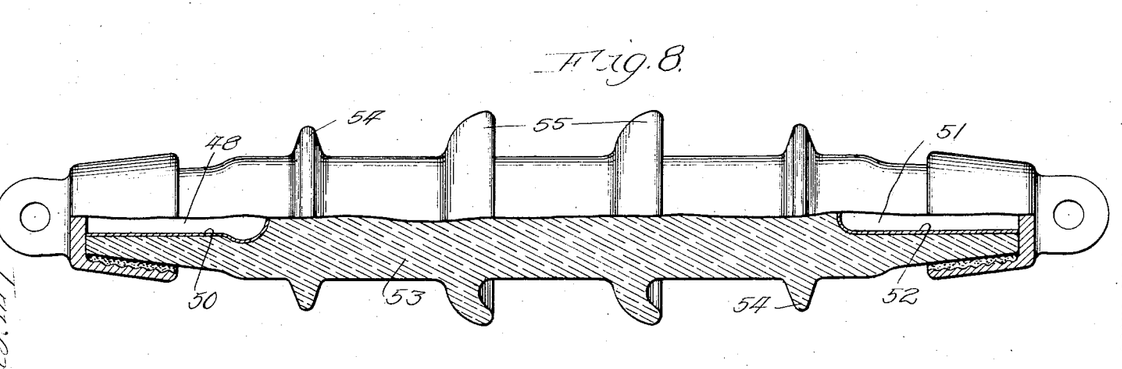

The form of the invention shown in Fig. 8 is similar to that of Fig. 7, with the exception that a different form of insulator 53 is employed, the insulator being of practically uniform diameter throughout its central body portion and being provided with flanges 54 and petticoats 55.

Figure 9:
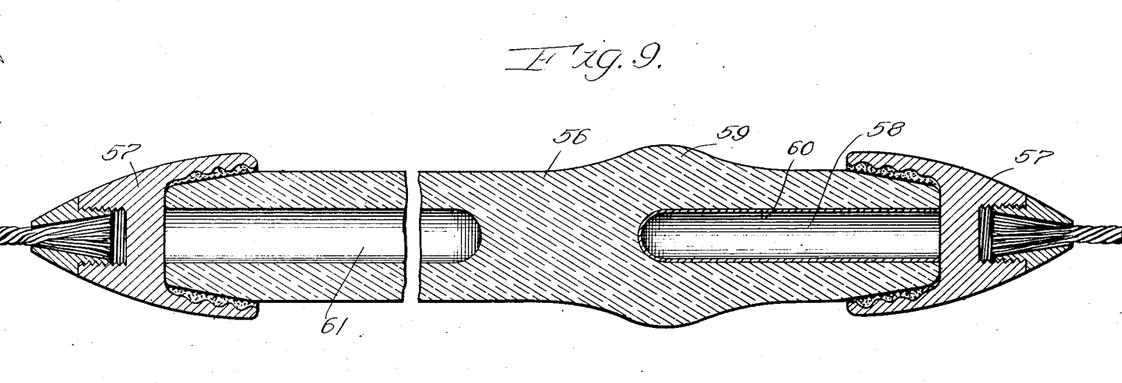

In Fig. 9 an insulator 56 is shown provided with end caps 57 similar to those illustrated in Fig. 5, the end caps of this type being particularly applicable to submarine work. In this form of the invention an opening 58 extends from one end of the insulator and terminates within an enlarged portion 59 which provides increased dielectric strength about the portion of the opening where the flux density is the greatest. The interior of the opening 58 is coated, as shown at 60, with a metallic coating to provide a flux distributing member within the insulating material. The opposite end of the insulator is provided with an inwardly extending opening 61 which may or may not be internally coated with a conducting film. The opening 61 decreases the weight of the insulator and renders it less liable to injury from shock or vibration.

Figure 10:
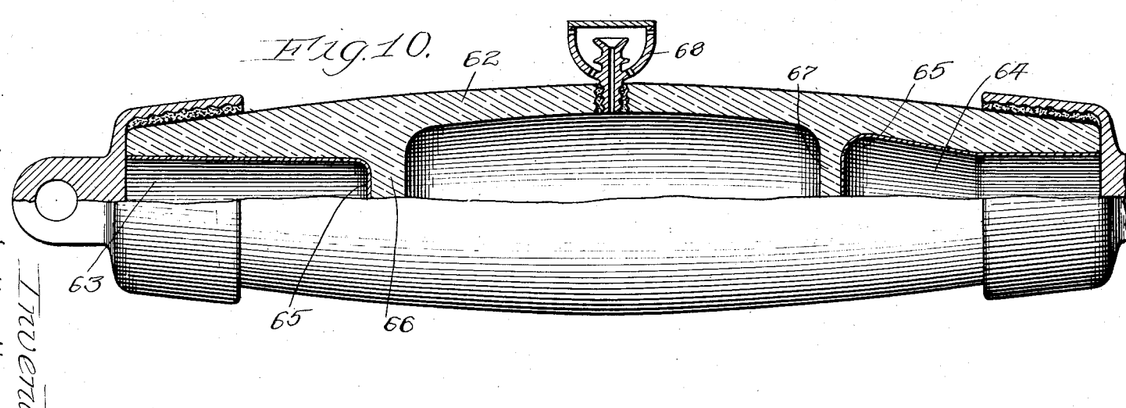

In Fig. 10 an insulator 62 is shown which is barrel-shaped in contour to provide mechanical strength and reliability and is provided with openings 63 and 64 which are internally coated, as shown at 65, to produce an insulated flux distributing surface. Baffle-plates 66 and 67 extend across the opening in the interior of the insulator and serve the double purpose of strengthening the insulator and providing insulation for the flux distributing coating 65. The baffleplates also insure against internal discharge through the insulator. A breather 68 may be provided to allow movement of air to or from the interior of the insulator.

Figure 11:
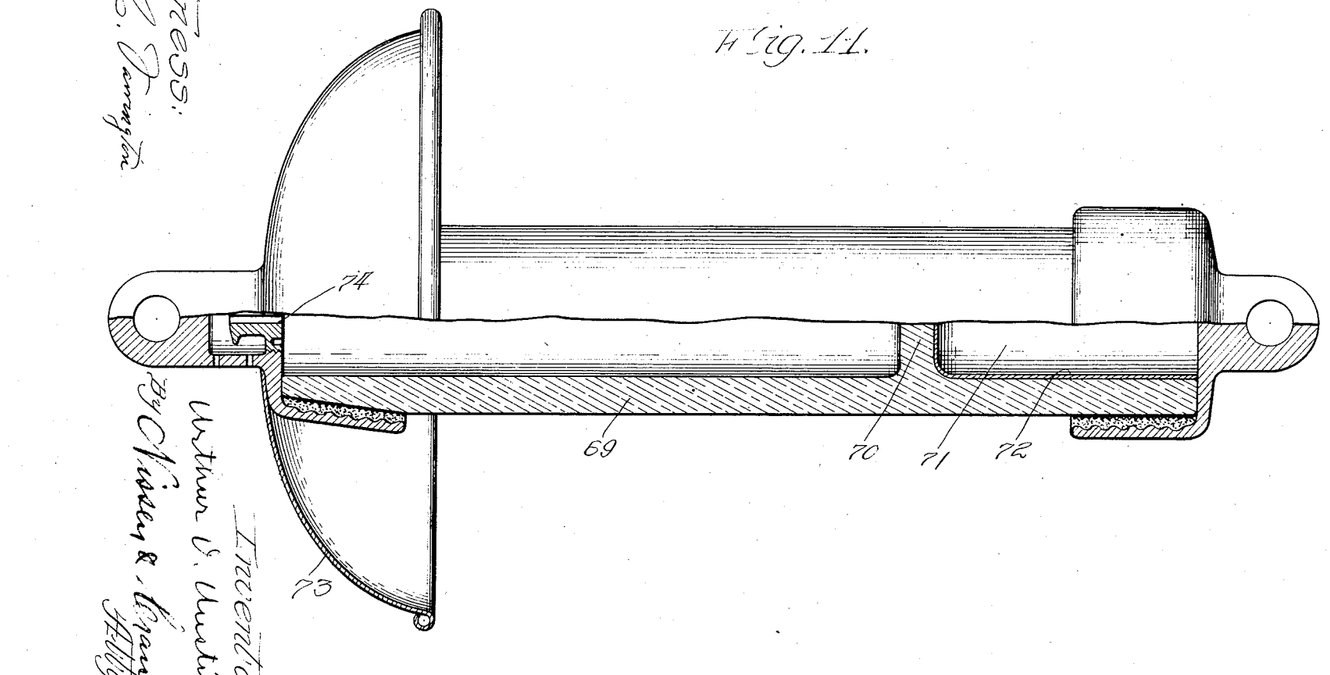

Fig. 11 shows a straight tubular insulator 69 provided with a baffle-plate 70 which divides the interior of the insulator into two parts, thus producing a chamber 71 adjacent one end which is lined with conducting material 72 to form an insulated flux distributing member. One end of the insulator may be provided with a weather shield 73 to assist in keeping the surface of the insulator dry. This shield may be omitted in cases where it is not required. A breather 74 provides access to the interior of the insulator to permit movement of air to or from the interior thereof and prevents the flow of water into the interior of the insulator.

Figure 12:
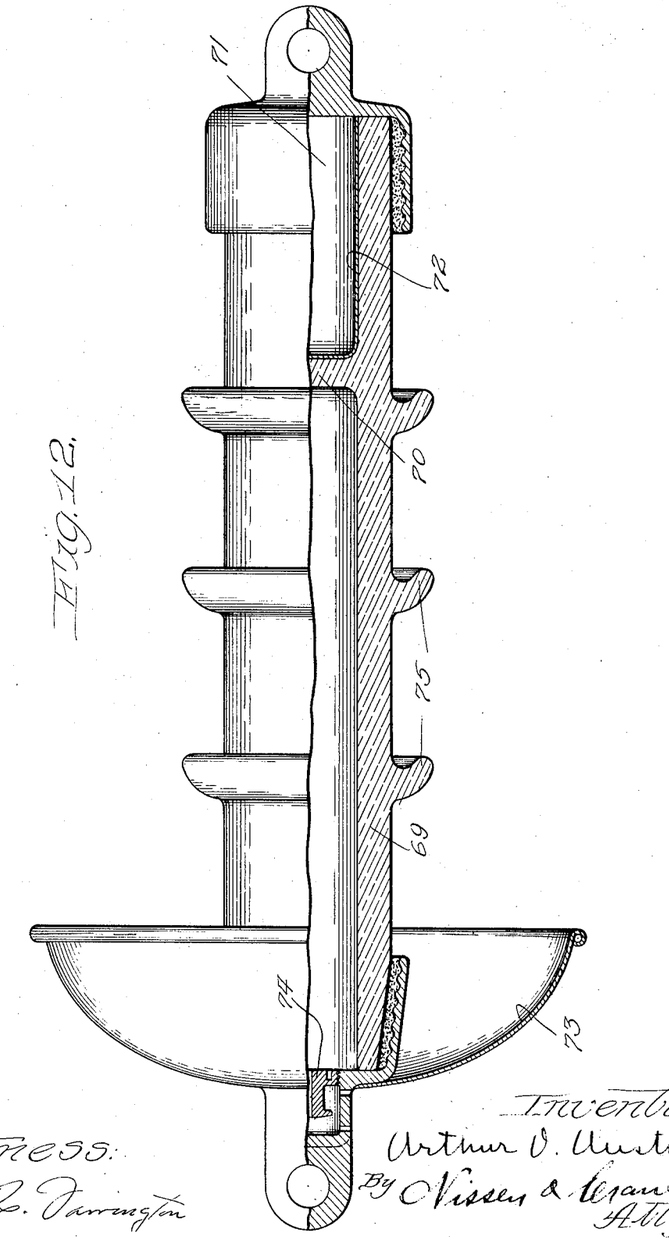

Fig. 12 shows a construction similar to Fig. 11 with the addition of petticoats 75.

Figure 13:
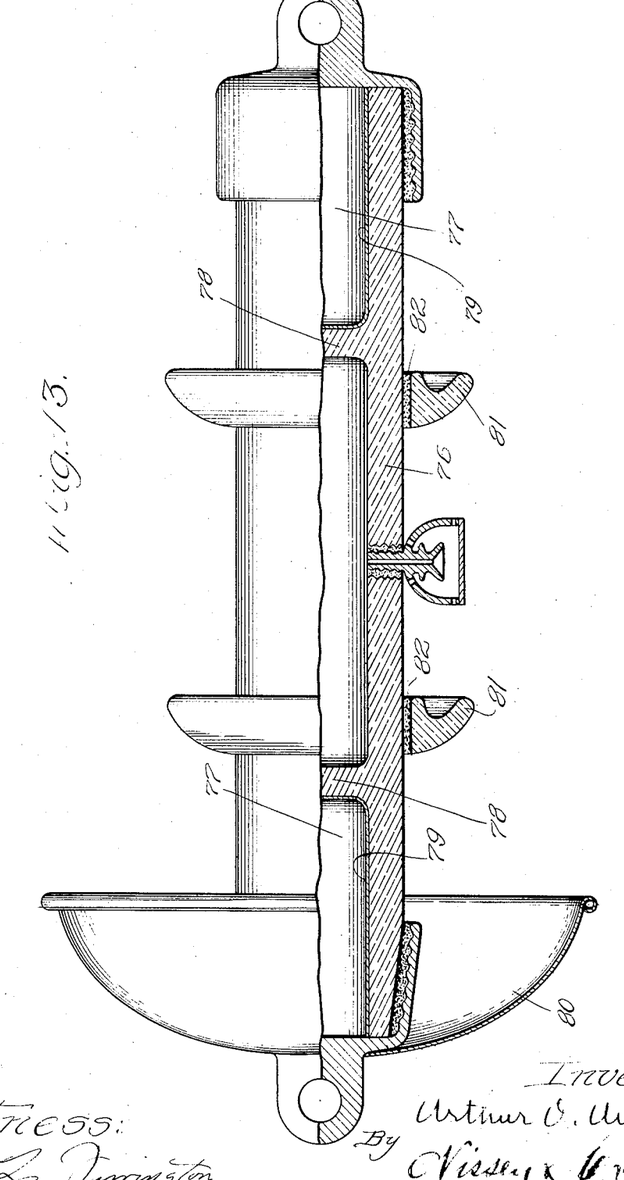

Fig. 13 shows an insulator 76 having chambers 77 at both ends formed by baffleplates 78 and lined with metallic coating 79 to produce an insulated flux screen or shield. A weather shield 80 similar to that shown in Figs. 11 and 12 may be used with this construction and petticoats 81 are separately formed and secured to the insulator by cement 82. The cement 82 should be of insulating material to force any leakage currents over the petticoats 81.

Figure 14:
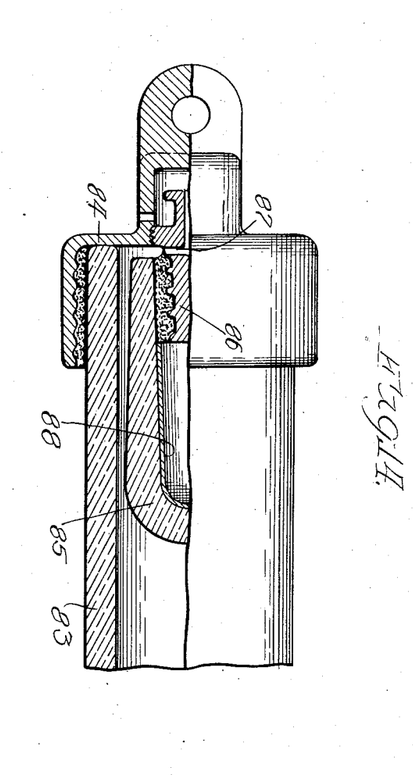

In Fig. 14 a tubular insulator 83 is shown provided with an end cap 84 and an internal insulating thimble 85 is supported on a plug 86 secured to the interior of the end cap 84. The plug 86 may be provided with openings 87 to facilitate circulation of air through the interior of the tube 83. The thimble 85 has its inner surface coated with a metallic coating 88 to provide a flux distributing member insulated by the thimble 85. The coating 88 is, of course, electrically connected with the end cap 84. For high potentials the cement will furnish sufficient conductivity for this purpose.

Figure 15:
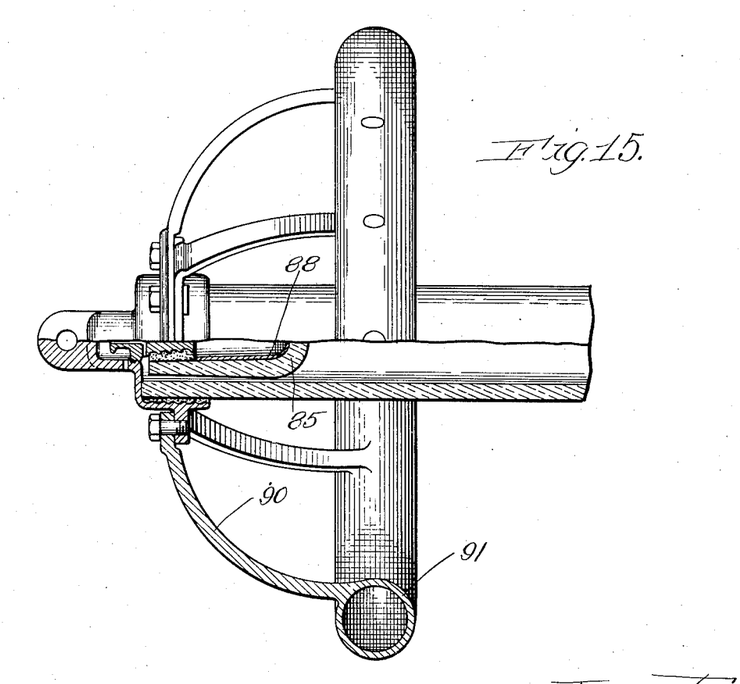

The form of the invention shown in Fig. 15 is similar to that of Fig. 14 with the addition of an external non-insulated flux distributing member 90. This member is provided with a smooth round metal portion 91 from which lines of force may emanate toward the opposite conductor and thus co-operate with the internal flux member 88 in preventing concentration of lines of force.

Figure 16:
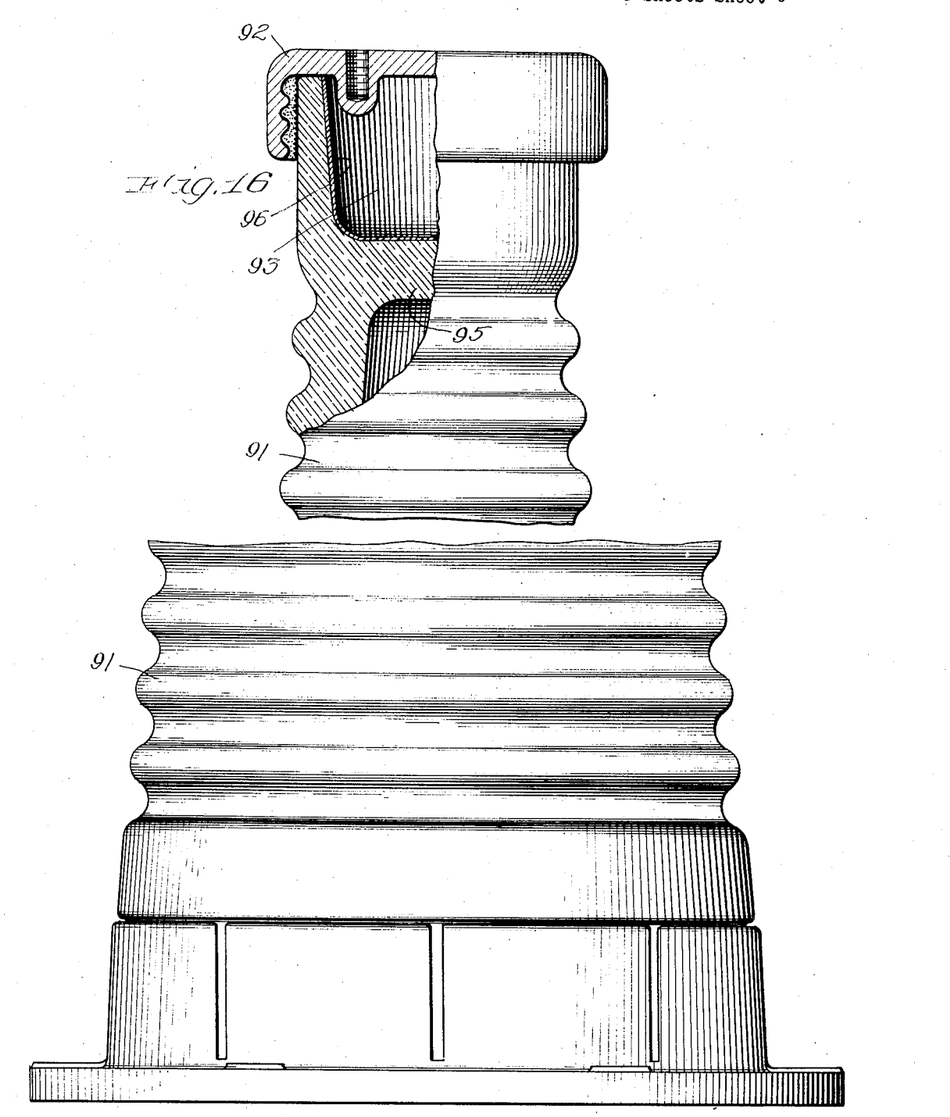
Fig. 16 shows one application of the invention to a pedestal insulator.

In Fig. 16 there is shown one method of applying the invention to a pedestal insulator having a dielectric support provided with a cap 92 at its upper end on which any desired form of conductor may be carried. The upper end of the pedestal is formed with an opening 93 extending downwardly therein, the lower portion being closed with a baffle plate 95. The interior of the opening is provided with a metallic coating 96 which acts as a flux distributing member in the manner previously explained. The flux distributing member in this and the other forms previously described, being electrically charged, tends to repel any discharge that might occur from the conductor with which it is connected for the reason that like charges repel one another and thus prevent the discharge arc from following the surface of the insulator with resulting injurious effects to the insulator.

Insulators constructed according to the present invention are particularly adapted for operation at radio frequencies and for operation in oil, compressed air or gas, or in other insulating mediums where the heating from charging currents starting from terminals may cause trouble. The flux distributing medium forms a low resistance path for the charging currents adjacent the terminals and provides good contact between the terminal members and the dielectric, thus avoiding heating due to charging currents at the junction of the terminal with the dielectric. This is especially true where the flux distributing medium is in the form of a metallic coating.

I claim:—

1. An insulator comprising a dielectric member, a connector mechanically secured to said dielectric member, and a flux distributing member arranged within an opening in said dielectric member and having a portion thereof extending beyond said connector and free from the mechanical load on said insulator, said opening terminating beyond said flux distributing member.

2. An insulator comprising a dielectric member, a support having mechanical connection with said dielectric member, and a flux distributing member electrically connected with said support and positioned within an inwardly terminated opening in said dielectric member and extending to a point within said dielectric member beyond the mechanical connection between said dielectric member and said support, said extending portion being free from load transmitting connection between said support and dielectric member.

3. An insulator comprising a dielectric member, conductors mechanically connected to opposite portions of said dielectric member and insulated from one another by said member, and a flux distributing member arranged within an inwardly terminated opening in said dielectric member and electrically connected with one of said conductors and extending toward the other of said conductors beyond the mechanical connection between said dielectric member and the conductor with which said distributing member is electrically connected, the opening within said dielectric member for said flux distributing member providing sufficient space in addition to that occupied by said flux distributing member to permit expansion of said members without producing undue stresses in said dielectric member.

4. An insulator comprising a dielectric member having a conductor mechanically connected thereto and having an inwardly terminated opening therein adjacent said conductor, and a flux distributing member arranged within said opening and comprising a conducting member electrically connected with said conductor and arranged to extend in the direction of the static field within said dielectric member to a position beyond the mechanical connection between said conductor and said dielectric member.

5. An insulator comprising a dielectric member, a conductor having mechanical connection therewith, said dielectric member having an inwardly terminated opening therein adjacent said conductor, and a coating of conducting material arranged upon the interior surface of said opening and electrically connected with said conductor, said coated surface being free to yield to expansion of said dielectric member.

6. An insulator comprising a dielectric member, supporting members having mechanical connections with opposite portions of said insulator for transmitting the load on said insulator, said insulator having an inwardly terminated opening therein extending from one of said supporting members toward the other, and a conductor electrically connected with said first-mentioned supporting member and arranged within said opening and extending toward the opposite supporting member to a position beyond all of the load transmitting portions of the mechanical connection between said supporting member and said dielectric member.

7. An insulator comprising a dielectric member, a supporting member having mechanical connection therewith for supporting the load on said insulator, and a conductor mechanically connected with said supporting member and positioned within an inwardly terminated opening in said insulator and extending in the direction of the field of force set up within said insulator when said conductor is charged to a position beyond all load supporting portions of the mechanical connection between said conductor and said insulator, said conductor being covered by dielectric material so that lines of force emanating therefrom will be intercepted by said dielectric material.

8. An insulator comprising an elongated dielectric member, a cap secured to one end of said member, and a conductor connected with said cap and arranged to extend within an inwardly terminated opening in said insulator to a point beyond the mechanical connection between said dielectric member and said cap to provide a flux distributing member from which lines of force will emanate through the material of said dielectric member, the innermost portions of said conductor being free from direct mechanical connection with said dielectric member.

9. An insulator comprising a dielectric member, a supporting member mechanically secured thereto, said dielectric member having an inwardly terminated opening therein adjacent said support, a metallic coating arranged upon the surface of said opening, and a metallic member connected with said support and extending into said opening and having an electrical connection with said metallic coating but spaced from the inner surface thereof to permit relative expansion and contraction of said dielectric member and metallic member.

10. An insulator comprising an elongated dielectric member, a cap mechanically connected to said member at one end thereof, there being an inwardly terminated opening extending into said dielectric member adjacent said cap, a metallic pin secured to said cap and projecting into said opening beyond the mechanical connection between said cap and said dielectric member, and mechanical connection between said pin and said dielectric member for a portion of the length thereof while other parts of said pin are spaced from the wall of said opening.

11. An insulator comprising a dielectric member, a support mechanically connected to said member, said dielectric member having an inwardly terminated opening therein adjacent said support and having an enlargement adjacent the inner extremity of said opening to provide thickened walls surrounding said extremity, and a flux distributing member arranged within said opening.

12. An insulator comprising an elongated dielectric member, a cap mechanically secured to one end of said member, a longitudinally arranged inwardly terminated opening extending inwardly from the end of said member adjacent said cap, said member having an enlarged portion adjacent the inner extremity of said opening to provide thickened walls surrounding said opening, and a flux distributing member arranged within said opening and electrically connected with said cap.

13. An insulator comprising a dielectric member, a support mechanically connected with said member, a flux distributing member electrically connected with said support and arranged within said dielectric member, said dielectric member having an enlarged portion adjacent said flux distributing member to provide thickened walls for insulating said flux distributing member at points where lines of force emanate therefrom, there being an opening within said dielectric member for accommodating said flux distributing member and providing free space in addition to the space occupied by said flux distributing member to provide for expansion.

14. An insulator comprising an elongated dielectric member, a cap mechanically connected to said member at one end thereof, said member having an inwardly terminated opening extending inwardly from the end of said member adjacent said cap, and a metallic coating arranged upon the interior surface of said opening and electrically connected with said cap, said dielectric member having an enlarged portion adjacent the inner end of said opening to provide thickened walls for insulating the mechanical coating on the surface of said opening.

15. An insulator having a dielectric member, a support mechanically connected with said dielectric member, and a flux distributing member extending from said support within an inwardly terminated opening in said dielectric member a greater distance than is necessary for mechanical connecting purposes and having an inner portion thereof spaced from said dielectric member.

16. The combination of a dielectric member, a conductor secured thereto, and a conducting member arranged within an inwardly terminated opening in said dielectric member and extending beyond all the mechanical connection between said conductor and said dielectric member and having the same potential as said conductor to control the path of any discharge from said conductor and repel such discharge from the surface of said dielectric member.

17. An insulator comprising a dielectric member, mechanical connecting means for securing a conductor thereto, and a flux screen for said connecting means comprising a conducting member having electrical connection with said mechanical connecting means and extending to a position within the static field beyond said mechanical connecting means, said flux screen being insulated to prevent electrical discharge therefrom.

In testimony whereof I have signed my name to this specification on this 30th day of November, A. D. 1920.

ARTHUR O. AUSTIN.